July 9, 1929.  A. A. WIEDMAIER  1,719,861
TRANSMISSION MECHANISM
Filed May 7, 1928
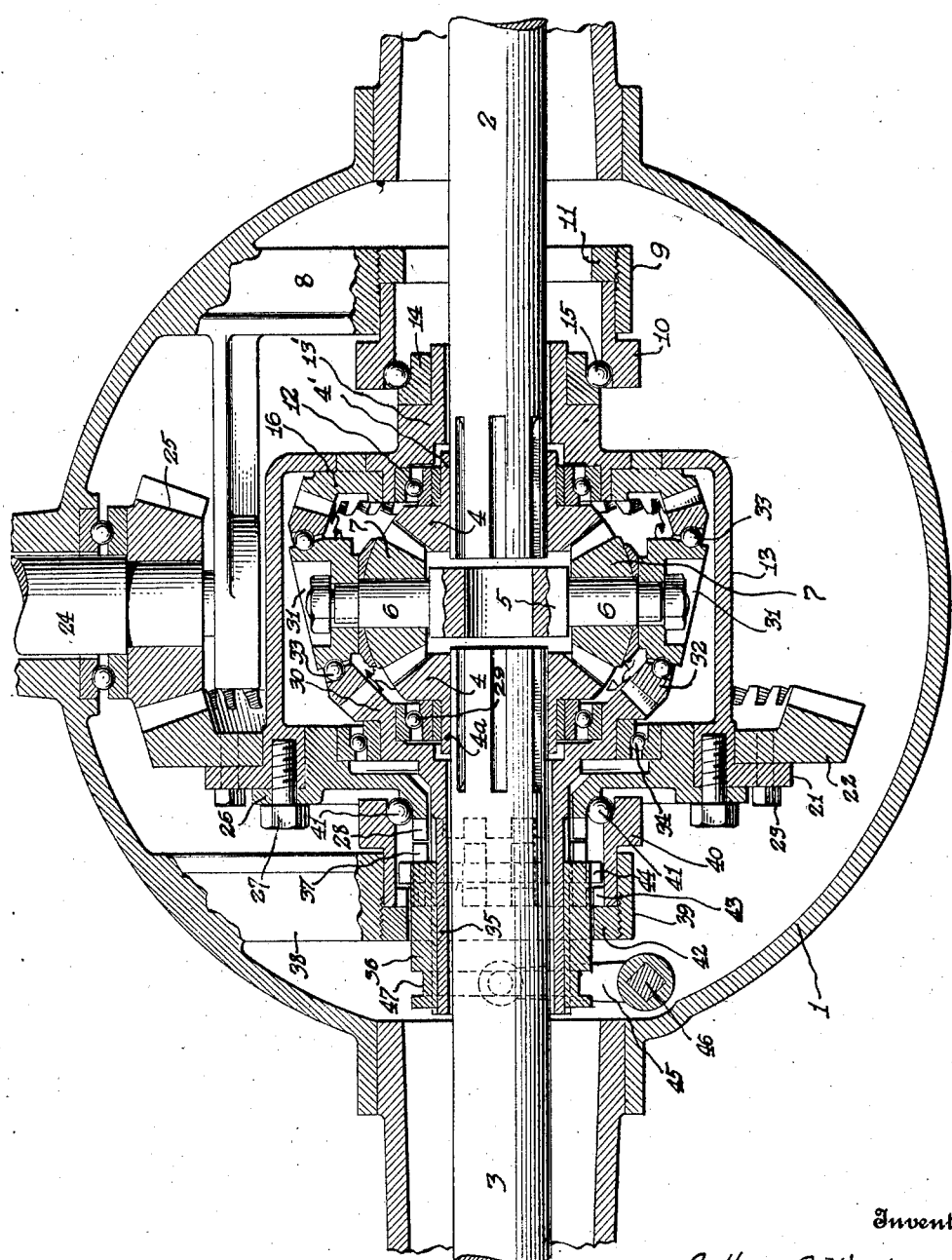
Inventor
Arthur A. Wiedmaier,
By
Attorneys Patented July 9, 1929.

1,719,861

UNITED STATES PATENT OFFICE.

ARTHUR A. WIEDMAIER, OF CLEVELAND, OHIO, ASSIGNOR OF ONE-HALF TO LLOYD M. FIELD, OF CLEVELAND, OHIO.

TRANSMISSION MECHANISM.

Application filed May 7, 1928. Serial No. 275,580.

The present application pertains especially to a variable speed transmission mechanism associated with the rear axle assembly of a motor driven vehicle, preferably in that portion of the rear axle housing which contains the differential mechanism. The invention, however, is also applicable to industrial machinery equipped with change speed mechanism, such as well drilling machinery, ditch diggers, rolling mills and the like.

The principal object of the invention is to provide a device to be used in conjunction with the usual variable speed transmission mechanism and adapted to add at least one speed to every speed obtainable by said mechanism. This result is accomplished by the use of a comparatively small number of parts made possible by the use of a pair of concentric gears of unequal diameter constituting one of the principal characteristics of the invention.

These unequal gears are rotatably mounted near the confronting ends of the axle shafts and outwardly of the differential gearing. The intermediate pinions of the differential gearing are carried by arms of a spider which floats between the axle shafts. Intermediate transmission gears connecting the unequal gears are journalled around or on the spider arms. One of the unequal gears is constantly driven by the propeller shaft. A clutch member is provided for selectively connecting the remaining unequal gear to the gear driven by the propeller shaft or to a stationary member. The latter connection effects a change of speed between the driven gear and the axle shafts, while the former connection constitutes a direct drive whereby both unequal gears and the differential mechanism are rotated bodily with the axle shafts.

The invention is fully disclosed by way of example in the following description and in the accompanying drawing in which the figure is a longitudinal horizontal section of a variable speed transmission mechanism constructed according to the invention.

The numeral 1 indicates the central portion of the rear axle housing usually employed for accommodating the differential mechanism. A pair of aligned axle shafts 2 and 3 extend to the center of the housing in the usual manner, and are suitably journalled in external members which need not be illustrated in the present instance.

Differential gears 4 are secured on the confronting ends of the axle shafts in the usual manner. Between these ends is mounted a floating spider comprising a hub 5 and arms 6. The arms serve as journals for intermediate differential pinions 7 in mesh with opposed differential gears 4.

A fixed arm 8 extends from the inner wall of the housing 1, near one end thereof, and is formed with a ring 9 surrounding the shaft 2. Into this ring is fitted a bearing race 10 retained by a collar 11 threaded into the ring. The differential gear 4 adjacent this structure has a sleeve 4' on which is mounted a ball bearing 12. A differential casing 13 has an integral collar 13' loosely surrounding the shaft 2 and carrying a ball race 14 which cooperates with the race 10 in carrying ball bearings 15. To the side of the casing 13 is secured, as by welding, a bevel ring gear 16. At the free edge of the casing 13 is a flange 21 to which is secured a driven gear 22 by means of a bolt 23.

The usual propeller shaft 24 which extends into the casing carries a bevel pinion 25 meshing with the gear 22. The speed of the propeller shaft is controlled by the ordinary transmission mechanism, and the drive between the propeller shaft and the axle shafts is further modified by the transmission mechanism constituting the present invention.

The differential casing is completed by an enclosure plate 26 secured to the flanged end of the member 13 by means of bolts 27 and having its central portion formed with a circular series of clutch teeth 28 surrounding the axle 3 at some distance therefrom. The differential gear 4 at this side has a sleeve 4ª around which is mounted a ball bearing 29 for the support of a transmission gear 30 of smaller diameter than the other transmission gear 16. To the ends of the spider arm 6 are fixedly secured bearing members 31 on which are journalled intermediate gears 32 meshing with the unequal gears 16 and 30, so that the axis of the intermediate gears are non-perpendicular to the axle shafts 2 and 3. Ball bearings 33 are interposed between each of the sloped gears 32 and the bearing member 31 on which it is mounted. A ball bearing 34 fitted in the plate 26 permits the smaller gear 30 to turn relatively to the differential casing.

The gear 30 has an extended sleeve 35 loosely surrounding the shaft and on which is splined a clutch member 36. On the end of this member are clutch teeth 37 adapted to engage with the clutch teeth 28 whereby to lock the gear 30 to the transmission casing and gear 16. A fixed or stationary member 38 extends inwardly of the housing 1 and is formed with a ring 39 concentric with the axle 3 and surrounding the same. Into this ring is fitted a race 40 which, in conjunction with the closure plate 26, supports a set of ball bearings 41 which permit rotation of the differential casing around the axle shafts. The member 40 is retained by a ring 42 threaded into the ring 39 and loosely surrounding the clutch member 36. The ring 42 has a series of clutch teeth 43 engageable by a peripheral series of teeth 44 on the clutch member 36, whereby the sleeve 35 of the gear 30 may be locked to the stationary member 39.

A shifting yoke 45 mounted on a rotatable spindle 46 engages in a groove 47 in the clutch member in the usual manner to permit rotation of the latter. By means of suitable linkage, the spindle 46 may be oscillated to slide the clutch member 36 on the sleeve 35.

In the operation of the device the gear 22 is constantly driven by the propeller shaft 24, the speed of which is determined by the usual transmission mechanism. When it is desired to impart the angular velocity of the gear 22 to the axle shafts, the clutch member 36 is engaged with the teeth 28 of the casing plate 26. The transmission or unequal gears 16 and 30 are thus turned bodily with the differential casing, whereby the spider 5 is also turned bodily and no change in speed occurs through the intermediate gears 32. In order to modify the speed of the axle shafts, the clutch member is shifted so that its teeth 44 engage the teeth 43 of the stationary member 42, whereby the smaller gear 30 is held against rotation. The larger transmission gear 16 turns with the differential casing 19 and thereby turns the intermediate gears 32 around the bearing members 31. The intermediate gears on thus turning against the fixed member 30, cause the differential gearing and spider to turn around the axis of the shafts 2 and 3 at a smaller angular velocity than the driven gear 22, the ratio of decrease being the ratio of the diameters of the gears 30 and 16.

A neutral adjustment of the clutch member between the teeth 28 and 43 is not contemplated, the actual neutral position being the direct drive accomplished by connecting the clutch to the teeth 28 of the casing plate 26.

Although a specific embodiment of the invention has been illustrated and described, it will be understood that various alterations in the details of construction may be made without departing from the scope of the invention as indicated by the appended claims.

What I claim is:—

1. In a variable speed transmission, a pair of axle shafts, differential gears secured on the confronting ends of said shafts, a spider disposed between said ends, differential pinions on the arms of said spider and meshing with said differential gears, transmission gears of unequal diameter rotatably mounted at said shaft ends, bearing members carried by the arms of said spider, intermediate gears journalled on said bearing members and connecting said transmisison gears, means for driving one of said transmission gears, and means for fixing the remaining unequal gear against rotation.

2. In a variable speed transmission, a pair of axle shafts, differential gears secured on the confronting ends of said shafts, a spider disposed between said ends, and differential pinions mounted on and supported solely by the arms of said spider and meshing with said differential gears.

3. In a variable speed transmission, a pair of axle shafts, differential gears secured on the confronting ends of said shafts, a spider disposed between said ends, differential pinions on the arms of said spider and meshing with said differential gears, transmission gears of unequal diameter rotatably mounted at said shaft ends, bearing members carried by the arms of said spider, intermediate gears journalled on said bearing members and connecting said transmission gears, means for driving one of said transmission gears, a stationary member, and a clutch member slidably mounted on the remaining unequal gear and adapted for connection selectively to said driving gear or the stationary member.

In testimony whereof I affix my signature.

ARTHUR A. WIEDMAIER.